US008934869B2

(12) United States Patent  
Edara et al.

(10) Patent No.: US 8,934,869 B2  
(45) Date of Patent: Jan. 13, 2015

(54) DETERMINING MOBILITY STATES FOR A USER DEVICE

(71) Applicant: Amazon Technologies, Inc., Reno, NV (US)

(72) Inventors: Kiran K. Edara, Cupertino, CA (US); Varada Gopalakrishnan, Cupertino, CA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/720,673

(22) Filed: Dec. 19, 2012

(65) Prior Publication Data

US 2014/0171088 A1    Jun. 19, 2014

(51) Int. Cl.
*H04M 1/66* (2006.01)
*H04W 36/32* (2009.01)
*H04W 36/30* (2009.01)
*H04W 36/36* (2009.01)
*H04W 64/00* (2009.01)

(52) U.S. Cl.
CPC .............. *H04W 36/32* (2013.01); *H04W 36/30* (2013.01); *H04W 64/006* (2013.01); *H04W 36/36* (2013.01)
USPC ........... 455/411; 455/442; 455/440; 455/436; 455/437; 455/456.1

(58) Field of Classification Search
CPC ..... H04W 36/06; H04W 36/08; H04W 36/10; H04W 36/14; H04W 36/24; H04W 36/34; H04W 36/32; H04W 36/30; H04W 36/36; H04W 36/16; H04W 36/00; H04W 64/006; H04W 64/003; H04W 64/00

USPC .......... 455/450, 452.2, 456.1, 440, 441, 437, 455/442, 436
See application file for complete search history.

(56) References Cited

U.S. PATENT DOCUMENTS

| 6,985,731 | B1  |   1/2006 | Johnson et al. |
|-----------|-----|----------|----------------|
| 2007/0025293 | A1  |   2/2007 | Choi |
| 2007/0064641 | A1* |   3/2007 | Laroia et al. ................. 370/320 |
| 2009/0143093 | A1* |   6/2009 | Somasundaram et al. ..... 455/525 |
| 2013/0079010 | A1* |   3/2013 | Brisebois et al. ............. 455/436 |
| 2013/0244654 | A1* |   9/2013 | Carmon et al. ............... 455/436 |
| 2013/0295951 | A1* |  11/2013 | Mach ........................ 455/456.1 |
| 2014/0024381 | A1* |   1/2014 | Kim et al. ..................... 455/440 |
| 2014/0148174 | A1* |   5/2014 | Teyeb et al. .................. 455/441 |
| 2014/0248885 | A1* |   9/2014 | Van Lieshout et al. ....... 455/437 |

FOREIGN PATENT DOCUMENTS

WO          03/015442       2/2003

OTHER PUBLICATIONS

PCT International Search Report and Written Opinion of the International Searching Authority, for International Application No. PCT/US2013/076277 filed Dec. 18, 2013, 16 pages.

* cited by examiner

*Primary Examiner* — Khai M Nguyen
(74) *Attorney, Agent, or Firm* — Lowenstein Sandler LLP

(57) ABSTRACT

A mobility module receives sensor data from one or more sensors and determines the movement of type of movement of a user device, based on the sensor data. Based on the movement or rate of movement, the mobility module transitions the user device to a mobility state. The user device evaluates the power levels of radio signals from neighbor base stations using one or more measurement parameters that are scaled of offset based on the mobility state.

20 Claims, 8 Drawing Sheets

DETERMINING MOBILITY STATES FOR A USER DEVICE

BACKGROUND

A large and growing population of users enjoys entertainment through the consumption of media items, including electronic media, such as digital music (e.g., music tracks, songs, or audio clips), digital videos, digital images, electronic books (also referred to herein as ebooks), electronic newspapers, electronic magazines and other electronic reading material. For example, a user may listen to digital music using a smart phone, view a digital video using a tablet computer, or read an ebook using a tablet computer. The media item may be a streaming media item or a locally stored media item. A streaming media item may include content that is not stored locally on a computing device in advance, but rather, is received by and presented to the user while being obtained from another computing device (e.g., a server). A user may begin consumption of the streaming media item (e.g., begin viewing or playback) before receiving the entire media item. A locally stored content may be stored in a local memory (e.g., a hard disk) of the computing device. Users employ various electronic devices to consume such media items. Among these electronic devices are electronic book readers, cellular telephones, personal digital assistants (PDAs), smart phones, portable media players, tablet computers, electronic pads, netbooks, desktop computers, notebook computers and the like. The electronic devices may also be referred to as user devices or as mobile computing devices.

These electronic devices (e.g., user devices) often use wireless communication networks or other networks to download or upload digital media items. In addition, applications (e.g., streaming video applications, online banking applications, social network applications, browsers, email applications, etc.) may also use the communication networks to transmit or receive data (e.g., may receive email or may watch streaming videos using the wireless communication networks). The wireless communication networks or systems may be cellular networks (e.g., wireless wide area networks) such as Code Division Multiple Access (CDMA) networks, High Speed Packet Access Plus (HSPA+), Long Term Evolution (LTE) networks, Worldwide Interoperability for Microwave Access (WiMAX) networks, Global System for Mobile Communication (GSM) networks, etc. The wireless communication networks may also include WiFi networks (e.g., wireless local area networks) such as 802.11g networks, 802.11n network, etc. Some wireless communication networks may use multiple-input-multiple-output (MIMO) communication protocols (e.g., LTE networks, LTE Advanced networks, WiMAX networks, 802.11n networks, 802.11ac networks, etc.).

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
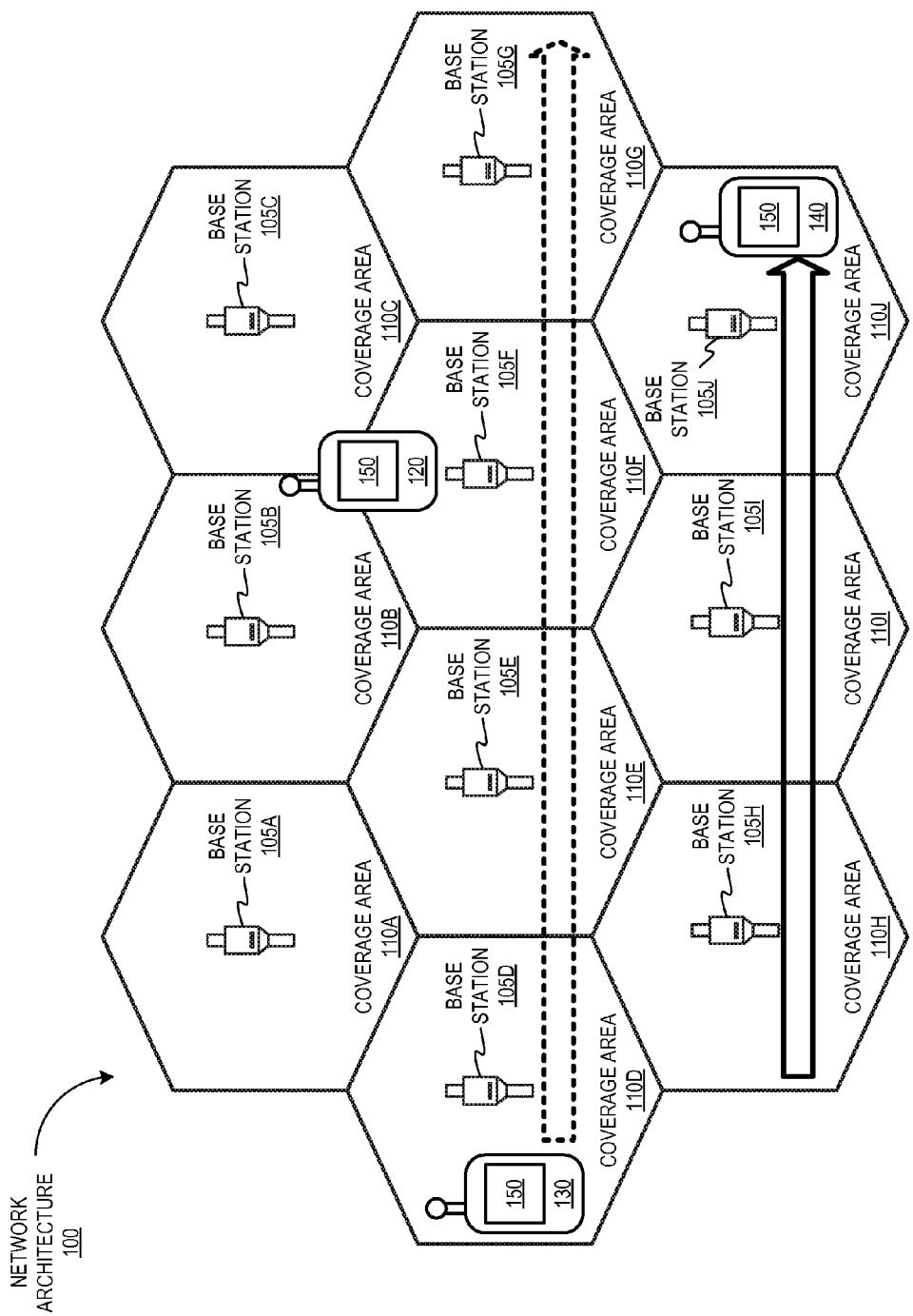
FIG. 1 is a block diagram illustrating a first example network architecture in which some embodiments of the disclosure may operate.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

User devices often use wireless communication networks to communicate data. The wireless communication networks include different base stations that provide coverage (e.g., send or receive radio signals) for the user devices. User devices may select a base station as a serving base station and may reselect to a neighbor base station. User devices may also handover from a serving base station to a neighbor base station. When performing reselections and handovers, the user devices may measure certain measurement parameters, such as the power level of radio signals transmitted by a base station (e.g., signal strength), an amount of time that a power level of a radio signal from one base station is greater than a power level of a radio signal from a second base station, etc.). These measurement parameters may be scaled based on a mobility state of a user device. A user device in a higher mobility state may apply a scaling factor that decreases the measurement parameters so that the user device will perform more measurements and will reselect or handover faster.

The mobility state of a user device may be determined based on the number of reselections the user device performs within a threshold period of time. However, because the mobility state of the user device is determine based on the number of reselections the user device has performed, the transition to a higher mobility state (e.g., high or medium mobility) of the user device may be delayed when compared to the actual movement of the device. In addition, the mobility state of a user device may also be inaccurate due to overlapping coverage areas of base stations. The overlapping coverage areas may cause a user device to reselect constantly which will cause the user device to transition to a high mobility state, even though the user device is not moving.

Embodiments of a method and apparatus are described determining a mobility state of the user device based on the movement of the user device. In one embodiment, the user device may obtain sensor data using one or more sensors on the user device (e.g., a GPS device, an accelerometer, a compass, etc.). Based on the sensor data, the user device may determine the actual movement of the user device. The user device may transition to different mobility states or remain in the current mobility state, based on the actual movement of the device. For example, a user device may transition to a high mobility state even though the number of reselections for the high mobility state has not occurred because the user device is actually travelling at a high speed (e.g., 65 miles per hour (MPH). In another example, the user device may remain in a normal mobility state even though the number of reselections for a high mobility state has occurred because the user device is not actually moving.

The embodiments described herein may be used for various wireless communication networks or systems such as Orthogonal FDMA (OFDMA) networks, Single-Carrier FDMA (SC-FDMA) networks, Code Division Multiple Access (CDMA) networks, Time Division Multiple Access (TDMA) networks, Frequency Division Multiple Access (FDMA) networks, etc. The terms "networks" and "systems" may be used interchangeably. A CDMA network may implement a radio technology such as Universal Terrestrial Radio Access (UTRA). UTRA includes Wideband-CDMA (W-CDMA). A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. Long Term Evolution (LTE) networks or systems may also use UTRA, E-UTRA, and GSM are part of the Universal Mobile Telecommunication System (UMTS). This disclosure may also refer to a base station. In other embodiments, other terminology may be used to reference to a base station. For example, a base station may be referred to as an access node, an access point, a NodeB, an eNodeB, a cell, a macro cell, a cell tower and so on.

FIG. 1 is a block diagram illustrating an example network architecture 100 in which embodiments of the disclosure may operate. The network architecture 100 includes base stations 105A through 105J. Each base station 105A through 105J may transmit and receive radio signals (e.g., radio frequency signals) to user devices, such as user devices 120, 130, and 140, within a respective coverage area 110A through 110J. The coverage areas 110A through 110J may be geographic areas within which the respective base stations 105A through 105J are able to transmit and receive radio signals to a user device. For example, base station 105A may communicate (e.g., transmit or receive radio signals) with a user device within the coverage are 110A. However, base station 105A may not be able to communicate with a user device that is within the coverage area 110B of the base station 105B. Although the coverage areas 110A through 110J are illustrated as hexagonal shapes, it should be understood that due to physical terrain (e.g., hills, mountains, valleys, forests, flat land, etc.), physical structures (e.g., buildings, skyscrapers, etc.), or radio interference from other sources of radio signals (e.g., other base stations) the coverage areas 110A through 110J may be any geometric or irregular shape. In one embodiment, the coverage areas of multiple cells may overlap. For example, the user device 120 is positioned in an area where the coverage areas 110B, 110C, and 110F overlap. The user device 120 may be able to communicate (e.g., transmit or receive radio signals) with any one of base stations 105B, 105C and 105F. Base stations that have overlapping coverage areas or are adjacent to each other may be referred to as neighbors, neighbor base stations, or neighbor cells. For example, base station 105A has neighbor base stations 105B, 105D and 105E. In another example, base station 105 E has neighbor base stations 105A, 105B, 105D, 105F, 105H, and 105I. In one embodiment, different sectors of a base station may also be referred to as a neighbors, neighbor base stations, or neighbor cells. For example, the base station 105D may have three different sectors or sections (not shown in the figures). Each sector or section may provide coverage for a portion of the coverage area 110D. It should be understood that a base station may have any number of different sectors or sections (e.g., 2 sectors, 6 sectors, etc.).

The network architecture 100 also includes user devices 120, 130, and 140. The user devices 120, 130, and 140 may be computing devices such as a desktop computer, a laptop computer, a mainframe computer, a personal digital assistant (PDA), a smart phone, a netbook computer, a tablet computer, an electronic book reader, etc. In one embodiment, the user devices 120, 130, and 140 may be mobile computing devices such as smart phones, PDAs, tablet computers, electronic book readers, laptop computers, cellular phones, etc. Each user device 120, 130, and 140 may use one or more of the base stations 105A through 105J to transmit data. For example, the user device 120 may use the base station 105 to receive (e.g., download) a media item using radio signals. In another example, the user device 130 may initiate a voice call using the base station 105D. The user devices 120, 130, and 140 may each be in a connected state or an idle state. In an idle state, a user device may not have an active communication channel with any base station. In a connected state, the user device may have at least one active communication channel with a base station. For example, connected states for user devices that use the WCDMA protocol include, but are not limited to, dedicated channel (CELL_DCH) state, forward access channel (CELL_FACH) state, a cell paging channel (CELL_PCH) state, and a UTRAN registration area paging channel (URA_PCH) state. In another example, user devices that use the LTE protocol may have one type of connected state and one type of idle state.

In one embodiment, a user device such as user device 120, may select one of the base stations 105A through 105J to be a serving base station. A serving base station may be a base station that the user device 120 has selected or "camped on." When the user device 120 establishes an active communication channel (e.g., the user device 120 makes a voice call, a data call, etc.), the user device 120 will communicate with the serving base station. In another embodiment, a user device, such as user device 130 may select (e.g., camp) on a base station and may move through different coverage areas. For example, the user device 130 may select base station 105D and the user device 130 may move from coverage area 110D, to coverage area 110E, to coverage area 110F, to coverage area 110G (as indicated by the dotted arrow in FIG. 1). As the user device 130 moves through the coverage areas 110E, 110F, and 110G, the user device may reselect from the base station 105D, to base station 105E, to base station 105F, and to base station 105G. The user device 130 may reselect from a first base station to a second base station when the power level or signal strength of a radio signal from the second base station is greater than the power level or signal strength of a radio signal from the first base station, for a threshold period of time. The reselection process performed by a user device is discussed in more detail below in conjunction with FIG. 2.

In one embodiment, a user device may communicate data with a base station via an active communication channel. For example, the user device 140 may be in a voice call using the base station 105H. As the user device 140 moves from coverage area 110H, to 110I, to 110J, the user device 140 may handover from base station 105H, to 105I, to 105J. A handover may be the process moving of an active communication channel from one base station to another base station. A handover may occur when a user device (e.g., user device 140) has an active connection with a first base station (e.g., base station 105H) and moves from the coverage area of the first base station towards the coverage area of a second base station (e.g., base station 105I). The first base station, the second base station, and the user device may communicate with each to coordinate the moving or the transition of the active connection to the second base station. The handover process performed by a user device is discussed in more detail below in conjunction with FIG. 2.

The user devices 120, 130, and 140 may measure power levels (e.g., signal strengths) of radio signals received by the base stations 105A through 105J. Based on the power levels of the radio signals, the user devices 120, 130, and 140 may reselect or handover from one base station to another base station. The measurements performed by the user devices 120, 130, and 140 are affected by a mobility state of the user devices 120, 130, and 140. The mobility state of a user device may indicate how fast a user device is moving or travelling (e.g., the rate of movement of the user device). Many communication standards (such as LTE, W-CDMA, HSDPA, etc.) include three different mobility states. The first mobility state may be a high mobility state which may indicate that that a user device is moving at a high speed (e.g., 50 miles per hour (MPH)). The second mobility state may be a medium mobility state, which may indicate that a user device is moving at a medium speed (e.g., 25 MPH). The third mobility state may be a normal mobility state or a low mobility state, which may indicate that the user device is moving at a slow speed (e.g., at walking speed of a person). Although the disclosure may refer to three different mobility states (e.g., high, medium, normal), it should be understood that other communication standards may use a different number of mobility states and that embodiments of the disclosure are applicable to the different number of mobility states. In embodiment, each of the different mobility states of the user device may be associated with a different number of reselections.

Based on the mobility state, the user device may scale or offset measurement parameters (e.g., a power level of a serving cell, a power level of a neighbor cell, a time period that the power level of the neighbor cell should be better than a power level of the serving cell, etc.) that are used by the user device when measuring radio signals. In one embodiment, a measurement parameter may be any value, variable, or time period that is used when measuring the signal strength (e.g., power level) of radio signals received from one or more base stations by a user device. For example, in order for a user device to reselect from a first base station to a second base station, the power level of the radio signal from the second base station should be better than the power level of the radio signal from the first base station for a certain period of time (e.g., 5 seconds). However, if the user device is in high mobility, the period of time may be decreased (e.g., decreased to 2 seconds). Generally, if the user device is in a high mobility state or a medium mobility state, the user device will scale the measurement parameters in order to allow the user device to reselect to a neighbor base station more quickly because the user device will move out of the coverage area of a serving base station more quickly due to the higher movement speed of the user device. A user device may also perform measurements of the power levels of radio signals more often in high mobility and medium mobility states when compared to the normal mobility state. Performing measurements of the power levels of radio signals may increase the energy usage of the user device and thus, decrease the battery life of the user device.

Generally, a mobility state of a user device is determined based on the reselection conditions. Reselection conditions may include the number of reselections the user device has performed within a specified period of time and the period of time itself. For example, a user device may transition to a high mobility state if the user device performs ten reselections (e.g., a first reselection condition) within two minutes (e.g., a second reselection condition). In another example, the user device may transition to medium mobility state if the user device performs three reselections within one minute. Different communication standards may use a different number of reselections and different periods of time for transitioning to different mobility states. The time period for counting reselections may be referred to as $T_{CRmax}$. The threshold number of reselections for transitioning to a high mobility state may be referred to as $N_{CR\_H}$ and the threshold number of reselections for transitioning to a medium mobility state may be referred to as $N_{CR\_M}$. In other embodiments, other wireless communication standards may use different values for different reselection parameters, and may refer to the reselection parameters with different names.

Because the mobility state of the user device is determined based on the number of reselections the user device has performed, the transition to a higher mobility state (e.g., high or medium mobility) of the user device may be delayed when compared to the actual movement of the device. For example, user device 130 may reselect from base station 105D, to base station 105E, to base station 105F, to base station 105G. The user device may not transition to a high mobility state until the user device 130 performs the last reselection to base station 105G. However, the user device had already been moving at a high speed when it moved from coverage area 110D to 110E. In another example, the user device 140 may be in a high mobility state as the user device 140 moves through coverage areas 110H, 110I, and 110J. The user device may stop moving (e.g., user device was in an automobile that stopped moving) in coverage area 110J. The user device may not transition back to medium mobility or normal mobility until a period of time passes. However, the user device has already stopped moving in coverage area 110J. In addition, the mobility state of a user device may also be inaccurate due to overlapping coverage areas of base stations. For example, the user device 120 may be in an area where the coverage areas 110B, 110C, and 110F overlap. Due to varying radio frequency conditions (e.g., interference from other user devices or base stations, geographic features, physical structures, etc.), the user device 120 may constantly reselect between the base stations 105B, 105C, and 105F. Thus, the user device 120 may transition to a high mobility state or a medium mobility state, even though the user device 120 is not moving.

Each user device 120, 130, and 140 includes a mobility module 150. In one embodiment, the mobility module 150 may receive sensor data from a variety of sensors in the user device (e.g., a global positioning system (GPS) device, an accelerometer, a gyroscope, a compass, etc.). The sensor data received from a GPS device may also be referred to as location data. The mobility module 150 may compute movement data (e.g., data that indicates how the user device has moved or that indicates how the user device is currently moving) and may determine the rate of movement of a user device (e.g., the speed of the movement of the user device). For example, the mobility module 150 may determine that a user device is moving at 65 MPH. In another example, the mobility module 150 may determine that a user device is not moving (e.g., is stationary). The mobility module 150 may also determine the direction of the movement based on the movement data. For example, the mobility module 150 may determine that the user device is moving along a curved or straight path in a particular direction (e.g., northeast). In one embodiment, the mobility module 150 may transition the user device to a high mobility state or a medium mobility state based on the rate of the movement of the user device, even though the user device has not performed the number of reselections for the high mobility state or the medium mobility state within the threshold period of time. In another embodiment, the mobility module 150 may instruct the user device to remain in a current mobility state (e.g., remain in a normal mobility state) even though the user device has performed the number of reselections for a different mobility state (e.g., a high mobility state) within the threshold period of time. In one embodiment, the mobility module 150 may also use the number of reselections performed by a user device within the threshold period of time and the rate (e.g., speed) of movement of the user device when transitioning the user device to a mobility state or remaining in a mobility state. For example, the mobility module 150 may transition the user device to a high mobility state if the user device is moving at 55 MPH and has performed two reselections within one minute.

In one embodiment, by using the sensor data to determine a rate of movement for the user device (e.g., a speed or velocity of the movement of the user device), the mobility module 150 may be able to transition the user device to a higher mobility state more quickly than using the number of reselections alone. In another embodiment, by using the sensor data to determine a rate of movement for the user device, the mobility module may also be able to determine that a user device should not transition to a high mobility state or a medium mobility state and may remain in a normal mobility state.

In one embodiment, the mobility module 150 may receive sensor data from a variety of sensors in the user device and may determine the rate of movement of a user device while the user device 120, 130, or 140 has an active communication channel with a base station (e.g., while the user device 120, 130, or 140 is in a voice call or data call). When the user device 120, 130, or 140 evaluates radio signals from neighbor base stations, the mobility module 150 may scale or offset one or more measurements parameters used to evaluate the radio signals. For example, the mobility module 150 may apply an offset (e.g., decrease) the amount of time that the power level of a radio signal from a neighbor base station should be greater than the power level of a radio signal from a serving base station, before the user device will send a message (e.g., a measurement report indicating that the power level the radio signal from the neighbor base station is better than that of the serving base station). In another embodiment, the mobility module 150 may increase the frequency with which the user device 120, 130, or 140 evaluates (e.g., measures) the power levels of radio signals from neighbor base stations or the frequency with which the user device 120, 130, or 140 may send messages (e.g., measurement reports) to a serving base station indicating the power levels of radio signals from neighbor base stations.

In one embodiment, the base stations 105A through 105J may communicate with the user device using one or more wireless communication standards. For example, all of the base stations 105A through 105J may communicate with user devices using LTE. In another example, some of the base station 105A may communicate with user devices using LTE and base station 105B may communicate with user devices using W-CDMA (e.g., base stations 105A through 105J may be inter-radio access technology (inter-RAT) neighbors). In another embodiment, the base stations 105A through 105J may communicate using radio signals that have the same frequency. For example, base stations 105A through 105J may all communicate with user devices using 700 MHz radio signals. In a further embodiment the base stations 105A through 105J may communicate using radio signals that have different frequencies. For example, base station 105B may communicate with user devices using 800 MHz radio signals and base station 105E may communicate with user devices using 1700 GHz radio signals.

In one embodiment, the user device may receive the measurement parameters, scaling offsets, and a list of neighbor base stations from the user device's serving base station. For example, the serving base station may broadcast system information that may be used by the user device when accessing or using the base station. The system information may be broadcast to the user devices in messages such as system information blocks (SIBs). The SIBs may contain the measurement parameters, scaling offsets, or the list of neighbor cells that a user device may monitor or evaluate. In other embodiments, different wireless communication standards may broadcast the system information, such as the measurement parameters, scaling offsets, neighbor lists, etc., using different types of messages.

Figure 2:
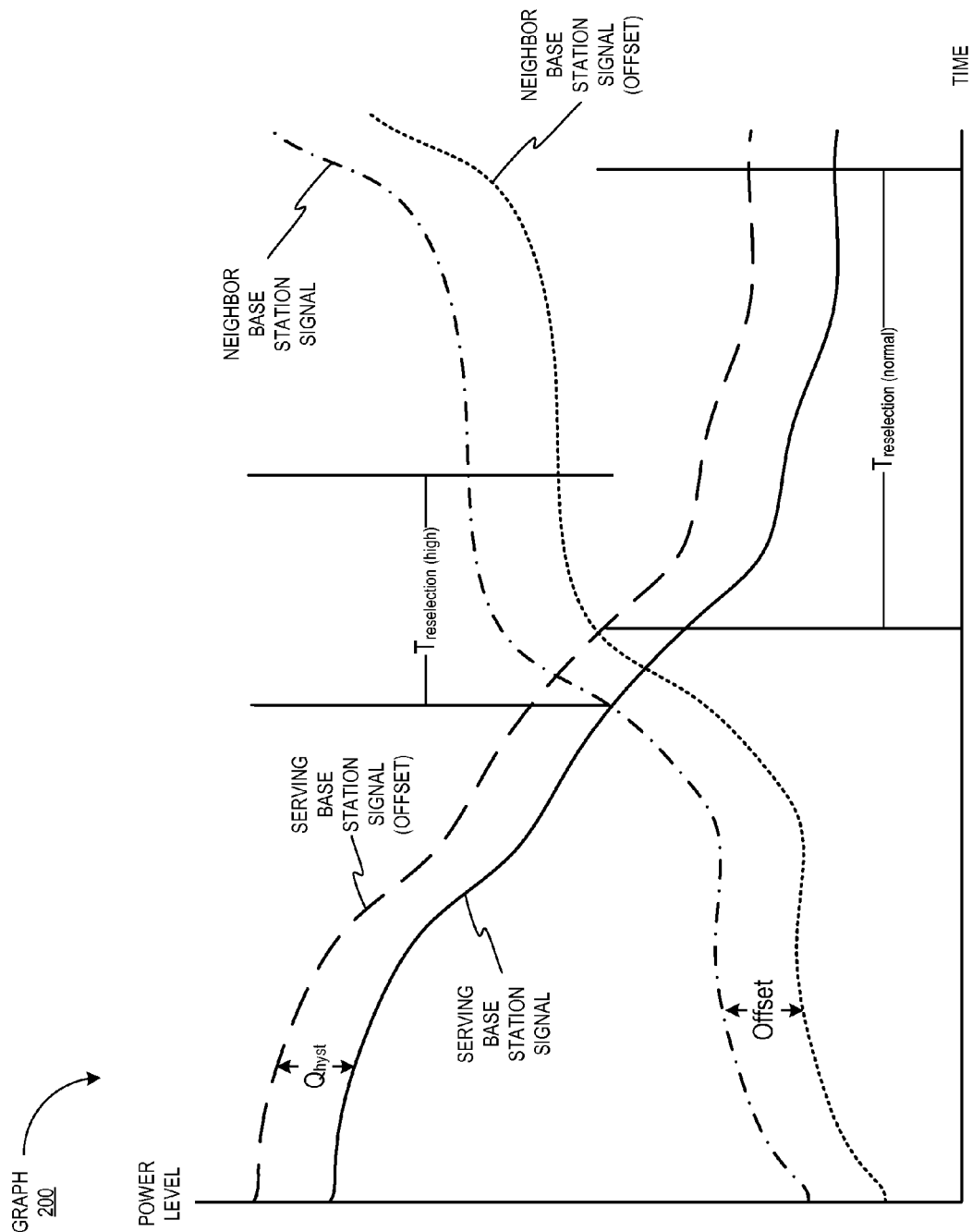
FIG. 2 is a graph illustrating a reselection process, according to one embodiment.

FIG. 2 is a graph 200 illustrating a reselection process, according to one embodiment. The graph 200 includes four lines, a solid line representing the power level of a serving base station (e.g., a serving base station) radio signal, a dotted and dashed line indicating the power level of a neighbor base station (e.g., a neighbor base station) radio signal, a dashed line indicating the power level of the serving base station after an offset $Q_{hyst}$ is applied, and a dotted line indicating the power level of the neighbor base station after an offset $Q_{offset}$ is applied.

As shown in FIG. 2, the power level of the radio signal received from the serving base station is decreasing as time increases and the power level of the radio signal received form the neighbor base station is increasing as time increases. When the user device is in normal mobility, the power level of radio signal from the serving base station is increased by the offset $Q_{hyst}$ and the power level of radio signal from the neighbor base station is decreased by $Q_{offset}$. As a result, the power level of the neighbor base station is not greater than the power level of the serving base station until the beginning of the time period $T_{reselection\ (normal)}$. The offsets $Q_{hyst}$ and $Q_{offset}$ may be used to reduce the number of times a user device reselects (e.g., increase the chance that the user device will stay camped on the serving base station) by scaling the serving base station power level up and scaling the neighbor base station power level down. Once the neighbor base station power level is greater than the serving base station power level for the time period $T_{reselection\ (normal)}$, the user device will reselect to the neighbor base station. The user device may calculate the power level for the serving cell and the neighbor cell using the following equations:

$$R_s = Q_{meas,s} + Q_{hyst} \qquad (1)$$

$$R_n = Q_{meas,n} - Q_{offset} \qquad (2)$$

where $R_s$ is the power level or rank of the serving cell, $R_n$ is the power level or rank of the neighbor cell, $Q_{meas,s}$ is the actual measured power level of the radio signal from the serving cell, and $Q_{meas,n}$ is the actual measured power level of the radio signal from the neighbor cell.

When the user device is in a high mobility state, the offsets $Q_{hyst}$ and $Q_{offset}$ may be adjusted by a scaling factor. For example, the offsets $Q_{hyst}$ and $Q_{offset}$ may be reduced by a scaling factor to 0. A scaling factor may be a value that is used to adjust or change (e.g., increase or decrease) another value. When the offsets $Q_{hyst}$ and $Q_{offset}$ are scaled down or reduced, the power the power level of the neighbor base station is greater than the power level of the serving base station at an earlier point in time (e.g., at the beginning of the time period $T_{reselection\ (high)}$). This may allow the user device to reselect sooner than when the user device is in normal mobility. In addition, when the user device is in a high mobility state, the time period that the neighbor base station power level should be greater than the serving base station power level before a reselection occurs, is decreased. For example, as shown in FIG. 2, the a scaling factor is applied time period the time period $T_{reselection\ (normal)}$ to obtain a smaller time period $T_{reselection\ (high)}$. This may also allow the user device to reselect sooner than when the user device is in a normal mobility state.

Because a user device is moving faster when in a high mobility state or a medium mobility state (when compared to a normal mobility state), the user device may lose service (e.g., may be unable to receive radio signals) from the serving base station more quickly. Applying scaling factors to the one or more of the offsets $Q_{hyst}$ and $Q_{offset}$ and the time period $T_{reselection\ (normal)}$ allows the user device to reselect to a neighbor base station more quickly which helps to prevent the user device from losing service.

In one embodiment, the process for performing a handover (e.g., moving an active communication channel from a serving base station or base station to a neighbor base station or base station) may be similar to the process for performing a reselection. For example, before performing a handover, the power level of the radio signal from a neighbor base station should be greater than the power level of the radio signal from the serving base station for a threshold amount of time. In the handover process, the offsets for shifting the measured power levels of the radio signals from the serving base station and the neighbor base station, the time periods before a handover should occur, and the scaling factors may be referred to by different names and may have different values. For example, the signal strength of a base station may be referred to as "M" and the offset for the signal strength of the base station may be referred to as "CIO" (e.g., cell individual offset). The offset CIO may be adjusted or scaled based on the mobility state of the user device. A hysteresis parameter or H parameter may also be applied to the signal strength of a neighboring base station. The hysteresis parameter (e.g., H) may also be adjusted or scaled based on the mobility state of the user device.

Similar to the cell reselection process, the scaling factors may be used to reduce the amount of time before the user device performs a handover. Because the user device may be traveling at high speeds when in a higher mobility state, the user device may move away from the serving base station at a higher speed. Reducing the amount of time before the user devices performs a handover may reduce the chance that the user device will lose the active connection (e.g., drop a call). In one embodiment, the mobility state may also affect how the user device reports or communicates the power levels of the serving base station and neighbor base stations to the serving base station. A user device may use periodic reporting (e.g., send a message or report once every 500 milliseconds) or event based reporting (send a message or report when certain conditions or criteria are met). When the using periodic reporting, the user device may periodically send a message indicating the power level of radio signals received from the serving base station and power levels of radio signals received from neighbor base stations. When using event based reporting, the user device will send a message when the power level of radio signals received from a neighbor base station is greater than a power level of radio signals received from the serving base station for a period of time. These messages may be referred to as measurement reports. When the user device is in a high mobility state or a medium mobility state, the user device may send more periodic measurement reports or the period of time that the power level of a neighbor base station should be greater than the power level of the serving base station, may be decreased. Based on the measurement reports, the serving base station, the user device, and the neighbor base station may work in conjunction to handover the user device to the neighbor base station from the serving base station.

Figure 3:
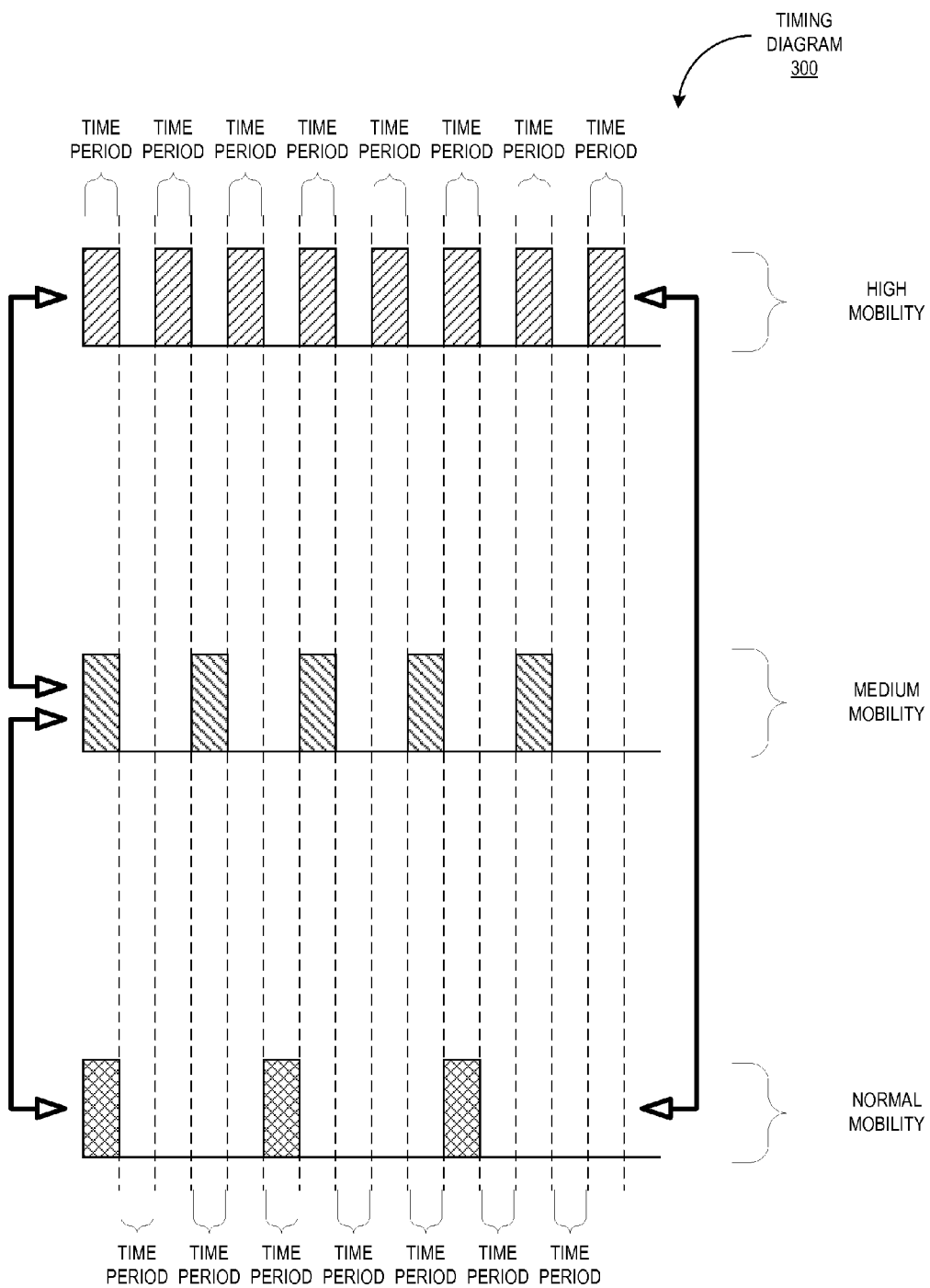
FIG. 3 is a timing diagram illustrating the number of times a user device may evaluate the power levels of radio signals from neighbor base stations for different mobility states.

FIG. 3 is a timing diagram 300 illustrating the number of times a user device may evaluate the power levels of radio signals from neighbor base stations (e.g., perform measurements of neighbor base stations) for different mobility states. The timing diagram 300 is divided into multiple time periods (as indicated by the dashed lines). As illustrated in the FIG. 3, the user device may evaluate the power levels of radio signals from neighbor base stations every other time period when the user device is in a high mobility state. From the high mobility state, the user device may transition to a medium mobility state or a normal mobility state (as indicated by the arrows). In the medium mobility state, the user device may evaluate the power levels of radio signals from neighbor base stations every third time period. From the medium mobility state, the user device may transition to the high mobility state or the normal mobility state. In the normal mobility state, the user device may evaluate the power levels of radio signals from neighbor base stations every fifth time period. From the medium mobility state, the user device may transition to the high mobility state or the medium mobility state.

In one embodiment, the user device may determine the power level of a radio signal received from the serving base station (e.g., the serving radio signal) every time period. If the power level of the serving radio signal is below minimum threshold (e.g., if the S criterion is not satisfied for LTE or UMTS communication standards), the user device may evaluate the power levels of radio signals received form neighbor base stations. Thus, the user device may not evaluate the power levels of radio signals from neighbor of radio signals from neighbor base stations at regular intervals are illustrated in FIG. 2. The user device may evaluate the power levels of radio signals from neighbor base stations when the minimum threshold for the power level of the serving radio signal is below minimum threshold. In one embodiment, a scaling factor may be applied to minimum threshold (e.g., an S criterion based on the mobility state of the user device). For example, if the user device is in high mobility, a scaling factor may be applied to the minimum threshold to increase the minimum threshold. In another example, when the user device uses the WCDMA or LTE protocols, the user device may use the parameter $Q_{rxlevminoffset}$ when evaluating the power level of the serving radio signal. The user device may offset the power level of the serving radio signal using the parameter $Q_{rxlevminoffset}$ to increase the minimum threshold. The value of the parameter $Q_{rxlevminoffset}$ may be based on the mobility state of the user device. A higher minimum threshold may cause the user device to perform measurements more often because the minimum threshold will not be satisfied more often. This may cause the user device to perform more measurements in high mobility state or a medium mobility state.

When the user device evaluates the power levels of radio signals from neighbor base stations, the user device may use battery power. For example, the user device may tune an antenna to a certain frequency to detect radio signals from neighbor base stations. The user device may also analyze the radio signals to determine the power level or strength of the radio signal. After evaluating the power levels, the user device may determine whether the user device should reselect to a neighbor base station. Each of these operations may cause the user device to use more energy (e.g., use more battery power) than when the user devices does not evaluate power levels. Thus, the user device will use more power in high mobility and medium mobility states due to the increase in measurements.

As discussed above, the user device may be located in an area with overlapping coverage from multiple base stations. The overlapping coverage may cause the user device to constantly reselect which may cause the user device to transition to high mobility and to use more power to perform measurements more frequently. A mobility module in the user device may determine that the user device is not actually moving or is not moving fast enough (e.g., is not moving faster than 50 MPH). The mobility module may cause the user device to remain in a normal mobility state and allow the user device to use less power because the user device is performing measurements less frequently than when the user device is in the high mobility state.

Figure 4:
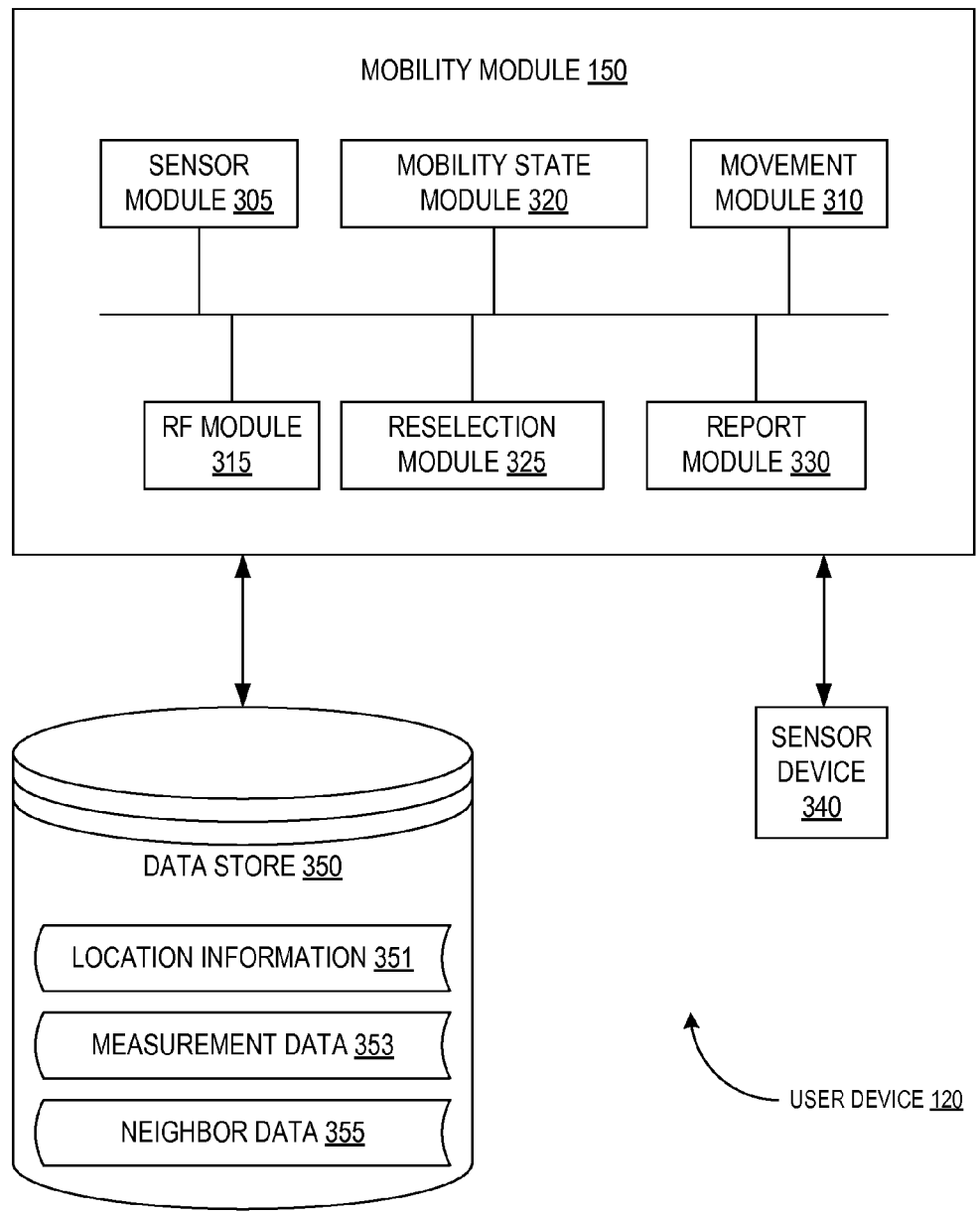
FIG. 4 is a block diagram illustrating mobility module in a user device, according to one embodiment.

FIG. 4 is a block diagram illustrating mobility module 150 in a user device 120, according to one embodiment. The mobility module 150 includes a sensor module 305, a movement module 310, an RF module 315, a mobility state module 320, a reselection module 325, and a report module 330. More or less components may be included in the mobility module 150 without loss of generality. For example, two of the modules may be combined into a single module, or one of the modules may be divided into two or more modules. In one embodiment, one or more of the modules may reside on different computing devices (e.g., different desktop or laptop computers). The mobility module 150 is communicatively coupled to the data store 350 and a sensor device 340. The sensor device 340 may include, but is not limited to, a GPS device, an accelerometer, a gyroscope, a compass, a barometer, a camera, a clock, etc.

In one embodiment, the sensor module 305 may communicate with the sensor device 340. The sensor module 305 may receive sensor data from the sensor device 340. For example, The sensor module 305 may receive location data (e.g., data such as GPS coordinates or location data) from a GPS device, sensor data (e.g., data indicating the amount of acceleration) from an accelerometer, sensor data (e.g., data indicating the orientation of the user device 120) from a gyroscope, sensor data (e.g., data indicating a direction such as north, southeast, etc.) from a compass, sensor data from the camera (e.g., video or image data), etc.

The movement module 310 may analyze the sensor data (e.g., location data) received by the sensor module 305 to determine a rate (e.g., a speed) of movement for the user device (e.g., stationary, accelerating, moving at a constant speed, moving in a certain direction, etc.). For example, the movement module 310 may analyze sensor data received from a GPS device (e.g., location data). The movement module 310 may compute or generate movement data (e.g., data indicative of how a user device has moved or how a user device is currently moving) based on the location data. For example, the movement data may indicate that the user device has travelled a certain distance within a certain time and in a certain direction. Based on the movement data, the module may determine one or more of the rate of movement of the user device (e.g., a speed such as 65 MPH) and the direction of movement (e.g., northeast). For example, the movement module 310 may determine that the user device is moving in a certain direction at a certain speed based on the sensor data. In another example, the movement module 310 may receive sensor data from an accelerometer and a compass. The movement module 310 may determine that the user device accelerated at a certain rate in a certain direction and after the acceleration, has maintained a constant speed. The movement module 310 may determine the speed of the user device and the direction based on the sensor data. In another example, the movement module 310 may receive sensor data from a camera (e.g., video data) and may be able to determine a speed of a user device based on the video data (e.g., estimate the speed of the user device based on video of passing scenery).

In some embodiments, the movement module 310 may use various algorithms, functions, or operations to determine the rate of movement of the user device. For example, the movement module 310 may use a Kalman filter to process sensor data received from an accelerometer to determine whether the user device is moving and the speed (e.g., 55 MPH) of the movement. In another example, the movement module may use sensor fusion algorithms (e.g., algorithms that combine sensor data received from various sensors to make a determination or perform a computation) to determine the movement of the user device 120. Sensor fusion algorithms may include, but are not limited to, the central limit theorem, Kalman filters, Bayesian networks, Dempster-Shafer theory, etc. In one embodiment, different sensor fusion algorithms may be used in combination with each other or other algorithms and functions to determine the rate or direction of movement of the user device.

In one embodiment, the user device 120 may include multiple sensor devices (e.g., a GPS device, a camera, an accelerometer, a gyroscope, and a compass). The movement module 310 may prefer certain types of sensor devices when these certain types of sensor devices are available. For example, movement module 310 may prefer to use sensor data from a GPS device (e.g. location data such as GPS coordinates, a location, or other data that may be used to determine a movement or a location). If sensor data from a GPS device is not available, the movement module 310 may use sensor data from an accelerometer and a compass. Or the movement module 310 may use sensor data from a camera when the sensor data from the GPS device is not available.

In one embodiment, the mobility state module 320 may determine a mobility state for the user device 120 based on the rate of movement determined by the movement module 310. For example, the movement module 310 may determine that the user device 120 is moving a 65 MPH. The mobility state module 320 may determine that the user device should transition from a normal mobility state to a high mobility state. In another example, the movement module 310 may determine that the user device 120 is stationary. The mobility state module 320 may determine that the user device should remain in a normal mobility state, even though the user device 120 may have reselected enough times to transition to a high mobility state.

In one embodiment, the RF module 315 may receive radio signals from one or more base stations. The RF module 315 may decode the radio signals and may measure the power level (e.g., strength) of the radio signals from the one or more base stations. The RF module 315 may also transmit radio signals to one or more base stations (e.g., may transmit data by encoding or modulating data using the radio signals). The RF module 315 may evaluate (e.g., measure) the power level of radio signals from one or more base stations based on the mobility state. For example, the RF module 315 may measure the power level of radio signals from neighbor base stations more often when the user device 120 is in a high mobility state or a medium mobility state (as illustrated in FIG. 3).

In one embodiment, the reselection module 325 may perform reselections based on the mobility state determined by the mobility state module 320. The reselection module 325 may apply scaling factors to measurement parameters and time periods when determining whether to reselect to a neighbor base station. The reselection module 325 may apply different scaling factors based on the mobility state of the user device 120. For example, the reselection module 325 may apply a first scaling factor to the offset $Q_{hyst}$ when the user device 120 is a high mobility state, may apply a second scaling factor to the offset $Q_{hyst}$ when the user device 120 is a medium mobility state, and may apply a third scaling factor to the offset $Q_{hyst}$ when the user device 120 is a normal mobility state. After applying the scaling factors to the measurement parameters or time periods, the reselection module will determine whether criteria for reselection (as discussed above in conjunction with FIG. 2) have been met and may reselect to a neighbor cell when those criteria are met.

In one embodiment, the report module 330 may send one or more reports based on the mobility state determined by the mobility state module 320. The report module may 330 send periodic measurement reports when periodic reporting is used and when the user device 120 is in a high mobility state or a medium mobility state. The report module 330 may also send event based measurement reports when event based reporting is used. For example, the report module 330 may send a measurement report when the power level of a neighbor base station is greater than the power level of the serving base station for a period of time (e.g., when the event occurs). In one embodiment, the report module 330 may send a measurement report indicating a type 1 event (e.g., event 1) for intra-frequency neighbor base stations, a type two event (e.g., event 2) for inter-frequency neighbor base stations, or a type 3 event (e.g., event 3) for inter-RAT neighbor base stations. The report module 330 may also decrease the period of time that the power level of a neighbor base station should be greater than the power level of the serving base station, based on the mobility state of the user device 120.

The mobility module 150 is coupled to a data store 350. The data store 350 may be a memory (e.g., random access memory), a cache, a drive (e.g., a hard drive), a flash drive, a database system, or another type of component or device capable of storing data. The data store 350 may also include multiple storage components (e.g., multiple drives or multiple databases) that may also span multiple computing devices (e.g., multiple server computers). The data store 305 includes location information 351, measurement data 353, and neighbor data 355.

The location information 351 may include data indicative of one or more geographic areas and typical mobility states for those geographic areas. For example, the location information 351 may include data indicating the location of a highway for automobiles. The location information 351 may indicate that user devices on the highway may generally be in a high mobility state (e.g., because the user may be driving on the highway). The mobility state module 320 may transition the user device 120 to a high mobility state based on the location information 351 and based on sensor data (e.g., location data) received form sensor device 340 (e.g., a GPS device). In another example, the location data may indicate a geographic area where coverage areas of different base stations overlap. The mobility state module 320 may determine that user devices in these overlapping coverage areas should not transition to a high mobility state because the reselections are a result of the overlapping coverage areas, and not the result of a movement of the user devices.

The measurement data 353 may include values for measurement parameters, values for offsets, values for scaling factors, and values for time periods. The measurement parameters, values for offsets, values for scaling factors, and values for time periods may be used by the user device 120 when evaluating power levels of radio signals from base stations (as illustrated in FIG. 3), when determining whether criteria for reselection have been met (as illustrated in FIG. 2), or when sending measurement reports. The measurement data 353 may be included in SIBs or other system information that is transmitted by one or more base stations. The neighbor data 355 may include a list of neighbor base stations that the user device 120 may measure. The neighbor base stations may be one or more of intra-frequency neighbors, inter-frequency neighbors, or inter-RAT neighbors.

Figure 5:
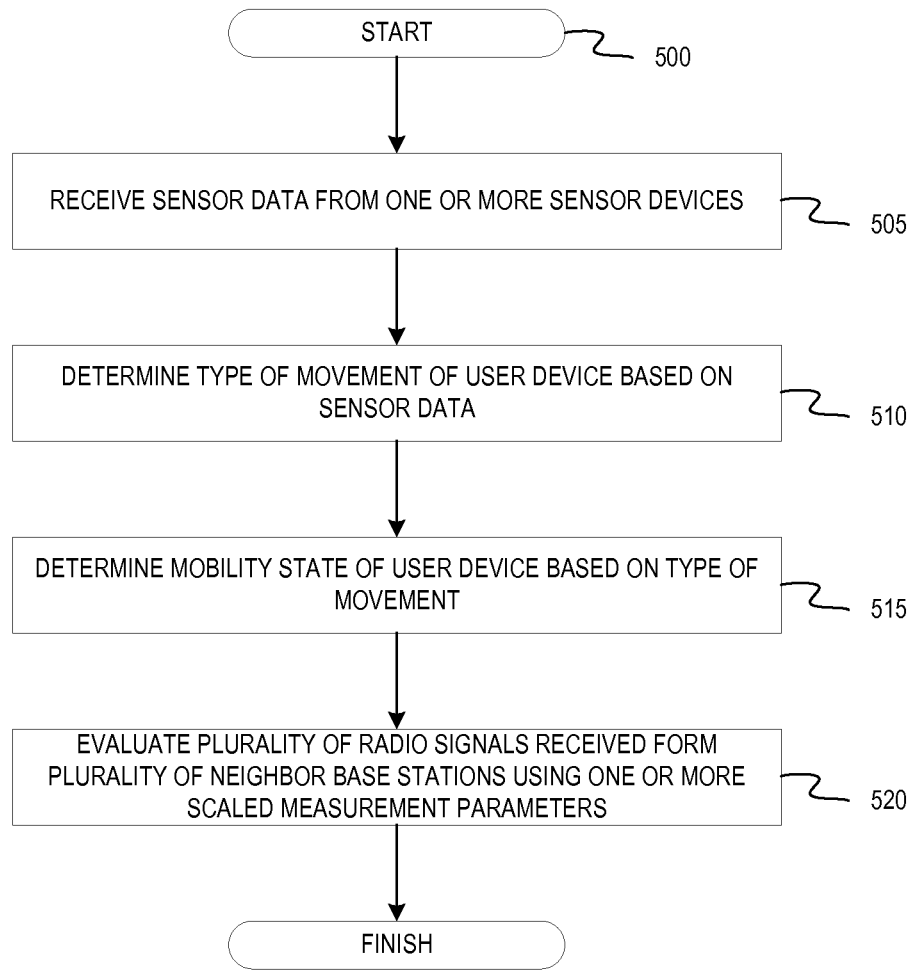
FIG. 5 is a flow diagram illustrating a method of determining a mobility state of a user device, according to one embodiment.
Figure 6:
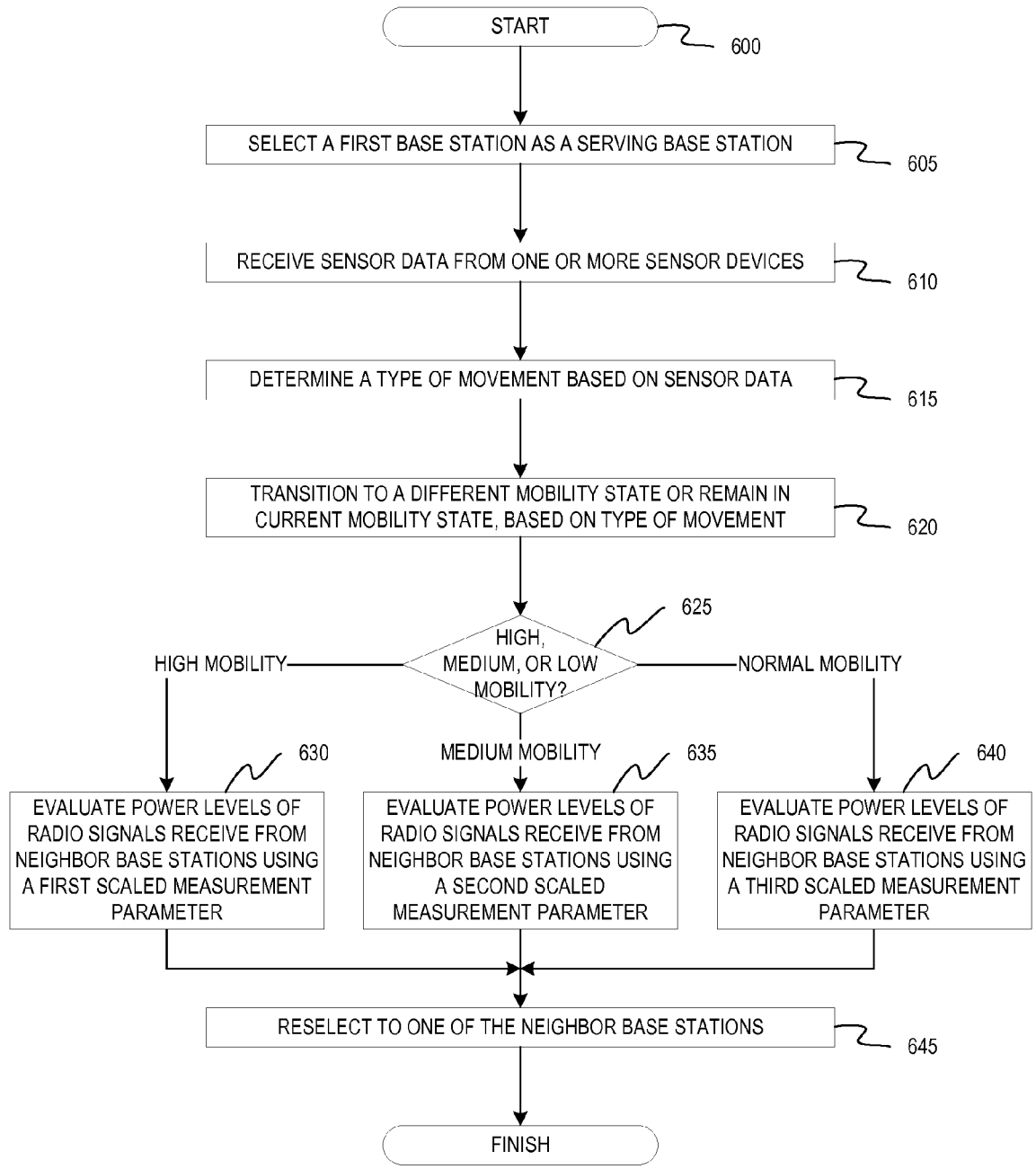
FIG. 6 is a flow diagram illustrating a method of determining a mobility state of a user device, according to another embodiment.
Figure 8:
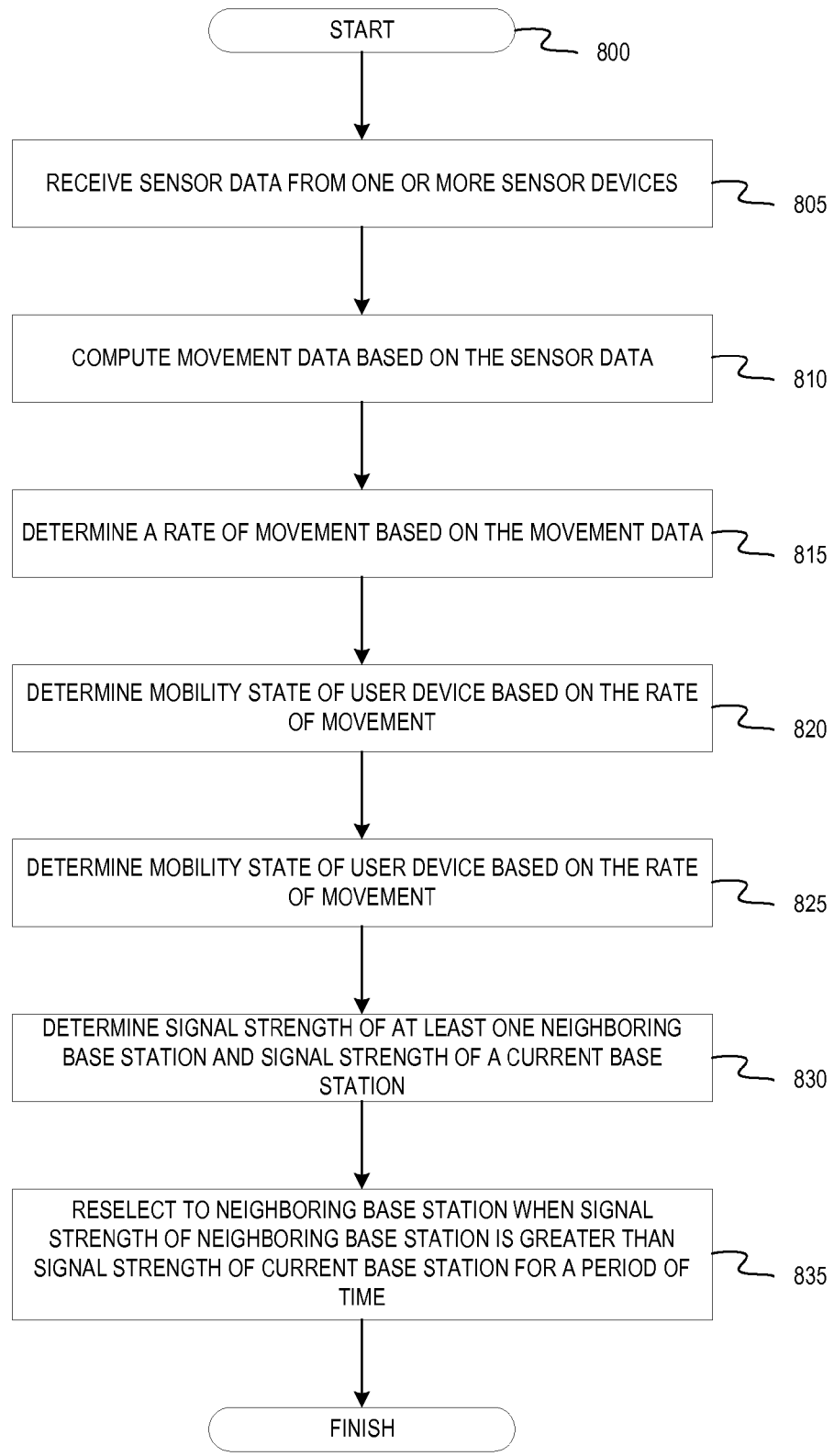
FIG. 8 is a flow diagram illustrating a method of determining a mobility state of a user device, according to a further embodiment.

FIGS. 5, 6, and 8 are flow diagrams illustrating methods determining a mobility state of a user device. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method of determining a mobility state of a user device, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a server device or by a mobility module, as illustrated in FIGS. 1 and 4.

Referring to FIG. 5, the method 500 begins at block 505 where the method 500 receives sensor data from one or more sensor devices. For example, the method 500 may receive sensor data from a GPS device (e.g., GPS coordinates). In another example, the method 500 may receive sensor data from an accelerometer and a compass (e.g., a rate of acceleration and a direction). At block 510, the method 500 may determine the rate of movement of the user device based on the sensor data. For example, based on the GPS coordinates received from a GPS device, the method 500 may determine that the user device is moving a 45 MPH. In another example, based on the sensor data indicating a deceleration of the user device, the method 500 may determine that the user device is not moving (e.g., is stationary).

At block 515, the method determines a mobility state of the user device based on the rate of movement. For example, if the method 500 previously determined that the user device was moving at a speed of 45 MPH, the method 500 may determine that the user device is in a medium mobility state. In another example, if the method 500 previously determined that the user device has decelerated and is no longer moving, the method 500 may determine that the user device is in a normal mobility state. At block 520, the method 500 evaluates a plurality of radio signals received from a plurality of neighbor base stations using one or more scaled measurement parameters. For example, the method 500 may determine a power level (e.g., a strength or a rank) of a neighbor base station using the offset $Q_{hyst}$. The method 500 may apply one of multiple scaling factors to $Q_{hyst}$ based on the mobility state of the user device. In another example, the method 500 may determine a $T_{reselection}$ time period and may scale the $T_{reselection}$ time period to obtain a shorter time period when the user device is in a high mobility mode. After block 520, the method 500 ends.

FIG. 6 is a flow diagram illustrating a method of determining a mobility state of a user device, according to another embodiment. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a server device or by a mobility module, as illustrated in FIGS. 1 and 4.

Referring to FIG. 6, the method 600 begins at block 605 where the method 600 selects a first base station as a serving base station. In one embodiment, the method 600 reselects to the first base station as the service base station at block 605. At block 610, the method 600 receives sensor data from one or more sensor devices. For example, the method 600 may receive GPS coordinates from a GPS device. At block 615, the method 600 may determine a rate of movement based on the sensor data. For example, the method 600 may determine that the user device is travelling at a certain speed, based on sensor data received from a GPS device. In another example, the method 600 may determine the location of a user device using the sensor data. Based on the location (e.g., a highway, a commercial building), the method 600 may determine the rate (e.g., speed or velocity) of movement for the user device.

At block 620, the method 600 may transition to a different mobility state or remain in the current mobility state, based on the rate of movement. For example, although the number of reselections for a high mobility state has not been satisfied, the method 600 may transition to a high mobility state because the rate of movement indicates that the user device is traveling at a high speed (e.g., 55 MPH). In another example, the although the user device has performed the number of reselections for the high mobility state, method 600 may remain in a normal mobility state because the method 600 may determine that the user devices is not actually moving and that the reselections are due to overlapping coverage areas. At block 625, the method 600 determines whether the user device is in a high, medium or low mobility state.

If the user device is in a high mobility state, the method 600 proceeds to block 630, where the method 600 evaluates the power levels of radio signals received from neighbor base stations using a first scaled measurement parameter. For example, the method 600 may scale the parameter $T_{reselection}$ using a first scaling factor. If the user device is in a medium mobility state, the method 600 proceeds to block 635, where the method 600 evaluates the power levels of radio signals received from neighbor base stations using a second scaled measurement parameter. For example, the method 600 may scale the parameter $T_{reselection}$ using a second scaling factor. If the user device is in a normal mobility state, the method 600 proceeds to block 630, where the method 600 evaluates the power levels of radio signals received from neighbor base stations using a third scaled measurement parameter. For example, the method 600 may scale the parameter $T_{reselection}$ using a third scaling factor. After blocks 630, 635 or 640, the method 600 may reselect to one of neighbor base stations at block 645. After block 645, the method 600 ends.

Figure 7:
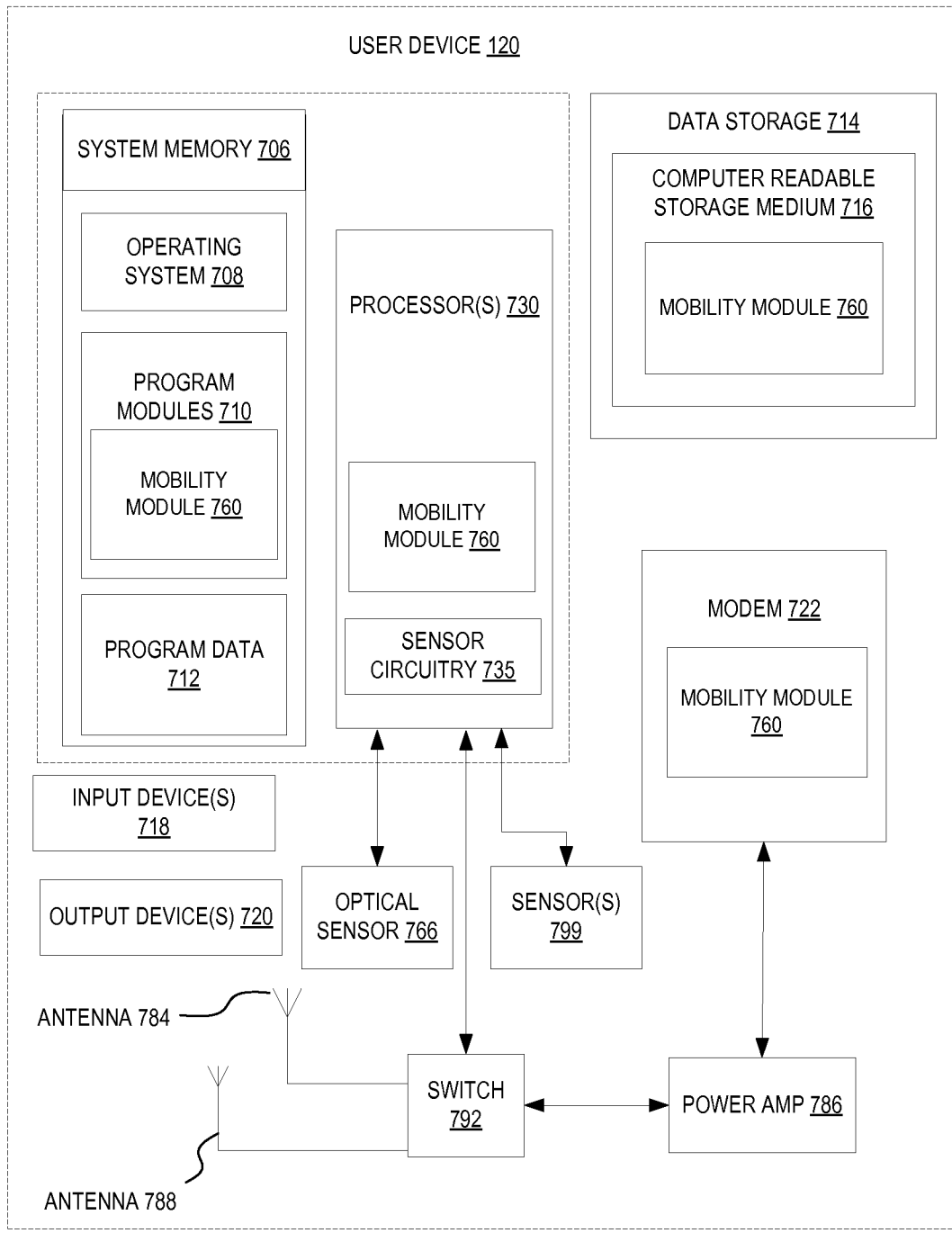
FIG. 7 is a block diagram of a user device in the example form of a computing device, in accordance with one embodiment.

FIG. 7 is a block diagram illustrating an exemplary user device 120, according to one embodiment. The user device 120 may correspond to the user device 104 of FIG. 1 and may be any type of computing device such as an electronic book reader, a PDA, a mobile phone, a laptop computer, a portable media player, a tablet computer, a smart phone, a camera, a video camera, a netbook, a desktop computer, a gaming console, a DVD player, a computing pad, a media center, and the like. The user device 120 may also be referred to as a mobile computing device.

The user device 120 includes one or more processors 730, such as one or more CPUs, microcontrollers, field programmable gate arrays, or other types of processors. The user device 120 also includes system memory 706, which may correspond to any combination of volatile and/or non-volatile storage mechanisms. The system memory 706 may include one or more of read-only memory (ROM), flash memory, dynamic random access memory (DRAM) such as synchronous DRAM (SDRAM)), and static random access memory (SRAM)). The system memory 706 stores information which provides an operating system component 708, various program modules 710 such as mobility module 760, program data 712, and/or other components. The user device 120 performs functions by using the processor(s) 730 to execute instructions provided by the system memory 706.

The user device 120 also includes a data storage device 714 that may be composed of one or more types of removable storage and/or one or more types of non-removable storage. The data storage device 714 includes a computer-readable storage medium 716 on which is stored one or more sets of instructions embodying any one or more of the methodologies or functions described herein. As shown, instructions for the mobility module 760 may reside, completely or at least partially, within the computer readable storage medium 716, system memory 706 and/or within the processor(s) 730 during execution thereof by the user device 120, the system memory 706 and the processor(s) 730 also constituting computer-readable media. The user device 120 may also include one or more input devices 718 (keyboard, mouse device, specialized selection keys, etc.) and one or more output devices 720 (displays, printers, audio output mechanisms, etc.). In one embodiment, the input devices 718 and the output devices 720 may be combined into a single device (e.g., a touch screen).

The user device 120 further includes a wireless modem 722 to allow the user device 120 to communicate via a wireless network (e.g., such as a cellular communication system) with other computing devices, such as remote computers, a media item providing system, and so forth. The wireless modem 722 allows the user device 120 to handle both voice and non-voice communications (such as communications for text messages, multimedia messages, media downloads, web browsing, etc.) with the wireless communication system 110. The wireless modem 722 may also allow the user device 120 to handle other signaling data to facilitate communication of the voice and non-voice data between the user device 120 and the wireless communication system 110. The wireless modem 722 may provide network connectivity using any type of mobile network technology including, for example, cellular digital packet data (CDPD), GPRS, EDGE, universal mobile telecommunications system (UMTS), 1 times radio transmission technology (1×RTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the mobility module 760 in addition to, or instead of, the mobility module 760 being included in the computer readable storage medium 716, system memory 706 and/or processor(s) 730. The mobility module 760 may be implemented as hardware, firmware and/or software of the wireless modem 722. It should be noted that the modem 722 may include a processing component that performs various operations to handle both voice and non-voice communications. This processing component can execute the mobility module 760. Alternatively, the mobility module 760 can be executed by a processing component of the user device, such as the processor 730 or other types of processing device as would be appreciated by one of ordinary skill in the art having the benefit of this disclosure.

The wireless modem 722 may generate signals and send these signals to power amplifier (amp) 780 for amplification, after which they are wirelessly transmitted via antenna 784 or antenna 788. A switch 792 is coupled between the power amp 780 and the two antennas 784, 788. In one embodiment, the switch 782 is controlled by the processor(s) 730. In another embodiment, the switch 792 is controlled by the wireless modem 722. The antennas 784, 788 may be directional, omni-directional or non-directional antennas. In addition to sending data, antennas 784, 788 can be deployed to receive data, which is sent to wireless modem 722 and transferred to processor(s) 730. In one embodiment, the antennas 784, 788 may be used to form communication links between the user device 120 and a base station (e.g., a NodeB or a cell tower).

Though a single modem 722 is shown to control transmission to both antennas 784 and 788, the user device 120 may alternatively include multiple wireless modems. In one embodiment, each modem includes an independent mobility module 760. Alternatively, a single mobility module (e.g., that is included in system memory 706, processor 730 and/or data storage 714) may determine a mobility state of the user device 120. In addition, the user device 120, while illustrated with two antennas 784, 788, may include more than two antennas in various embodiments.

The processor(s) 730 and the modem 722 may be a general-purpose processing devices such as a microprocessor, central processing unit, or the like. More particularly, the processor(s) 730 and the modem 722 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor(s) 730 and the modem 722 may also be one or more special-purpose processing devices such as an application specific integrated circuit (ASIC), a field programmable gate array (FPGA), a digital signal processor (DSP), network processor, or the like.

In one embodiment, user device 120 includes an optical sensor 766. The optical sensor 766 may be a low resolution camera (e.g., having 0.2 or 0.7 Megapixels) that takes images (e.g., of a user's eyes) on a periodic basis. Alternatively, the optical sensor 766 may have a higher resolution, such as 1 Megapixel up to 10 or more Megapixels. The optical sensor 766 may be positioned such that images are taken of a user's face while the user holds the user device 120 in front of his face in a standard reading position. Therefore, the optical sensor 766 may be used to track user eye movement during reading.

In one embodiment, user device 120 includes one or more sensors 799 such as a physical contact sensor or close proximity sensors. The sensors 799 can detect the human body parts proximate to the user device, and convey information regarding the detection to processor(s) 730. In one embodiment, the sensors 799 may be capacitive sensors that are configured to measure capacitance generated by the human body part proximate to the user device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 799 may also be optical (e.g., infrared) sensors that use an emitter and receiver pair to detect the presence of opaque objects. Alternatively, the sensors 799 may be inductive sensors, which include an inductive loop. When the presence of a human body part (or metal object) is brought close to the inductive sensor, an induction of the inductive loop changes, causing the human body part to be detected. Alternatively, the sensors 799 may be ultrasonic sensors that emit an ultrasonic signal and measure a time duration between when a signal is transmitted and the reflection of that signal received (a.k.a., flight response). The sensors 799 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 799 may be used to determine a distance between one or more of the antennas and the detected human body part. Though the detected object is described herein as a human body part, other types of objects may also be detected depending on the sensing technologies used.

In one embodiment, one or more of the sensors 799 may be inertial sensors. The sensors 799 can be used to detect motion of the user device 120. In one embodiment, the sensors 799 detect linear accelerations (translational movement) and angular accelerations (rotational movement). The sensors 799 may include compasses, accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The sensors 799 in one embodiment are micro-electromechanical systems (MEMS) sensors.

The processor(s) 730 may include sensor circuitry 735 (e.g., sensor device drivers) that enables the processor(s) 730 to interpret signals received from the sensor(s) 766 and/or inertial sensors 799. In one embodiment, the sensors 766 and/or inertial sensors 799 output fully processed signals to the processor(s) 730. For example, the sensors 766 may output a distance, a detected/not detected signal, etc. using a single line interface or a multi-line interface. Similarly, inertial sensors 799 may output an acceleration value (e.g., in Gs). In another embodiment, the sensors 766 output, for example, positional data and/or object presence data (e.g., of a human body part) to the processors 730 without first processing the data. Similarly, inertial sensors 799 may output, for example, voltage values that can be interpreted as acceleration values. In either instance, the processors 730 may use the sensor circuitry 735 to process and/or interpret the received data. If data is received from multiple sensors 766 and/or inertial sensors 799, processing the data may include averaging the data, identifying a maximum from the data, or otherwise combining the data from the multiple sensors. In one embodiment, in which the sensors 766 include a sensor array, numerous sensors, or a touch panel, processing the data includes determining where on the user device the human body part is located from multiple sensor readings.

In one embodiment, processor 730 controls whether the switch provides an electrical connection between the power amp 786 and the antenna 788. For example, if the processor 730 determines that one or more communication links should be reconfigured or modified, the switch 792 may terminate the electrical connection between the power amp 786 and the antenna 788 (e.g., may terminate a communication link). Alternatively, or in addition, modem 722 may control the switch.

FIG. 8 is a flow diagram illustrating a method 800 of determining a mobility state of a user device, according to a further embodiment. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by a server device or by a mobility module, as illustrated in FIGS. 1 and 4.

Referring to FIG. 8, the method 800 begins at block 805 where the method 800 receives sensor data from one or more sensor devices. For example, the method 800 may receive GPS coordinates from a GPS device. At block 810, the method may compute movement data (e.g., data indicative of how the user device has moved or is currently moving). For example, the method 800 may compute movement data indicating that the user device has moved a 50 meters towards the left within the last 5 seconds. In another example, the method 800 may determine the location of a user device using the sensor data. Based on the location (e.g., a highway, a commercial building), the method 800 may determine the rate (e.g., speed or velocity) of movement for the user device. At block 815, the method 800 may determine the rate of movement of the user device based on the movement data. For example, the method 800 may determine that the user device is moving northeast at a rate of 60 MPH.

At block 825, the method 800 determines the mobility state of the user device. For example, method 800 may determine whether the user device is in a high mobility state, a medium mobility state, or a normal mobility state. At block 830, the user devices determines the signal strength of one or more neighboring base stations (e.g., the strength of radio signals received from one or more neighboring base stations) and the signal strength of a serving or current base station that the user device has currently selected (e.g., camped on). In one embodiment, the method 800 may apply scaling factors to the signal strengths from the neighboring base stations and the current base station. The scaling factors may be based on the mobility state determined at block 825. At block 835, the method 800 reselects to a neighboring base station when the signal strength of the neighboring base station is greater than the signal strength of the current base station for a period of time. In one embodiment, a scaling factor may also be applied to the period of time. The scaling factor applied to the period of time may also be based on the mobility state determined at block 825. Thus, the period of time may be based on the mobility state because of the scaling factor applied to the period of time. After block 835, the method 800 ends.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "transitioning," "evaluating," "reselecting," "applying," "measuring," "remaining," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a mobile computing device, location data from a global positioning system device;
    computing, by the mobile computing device, movement data based, at least in part, on the location data;
    determining, by the mobile computing device, a rate of movement of the mobile computing device based, at least in part, on the movement data;
    determining a mobility state of the mobile computing device based, at least in part, on the rate of movement;
    determining a first signal strength of a neighboring base station relative to a second signal strength of a current base station;
    determining, by the mobile computing device, a scaling factor based on the mobility state;
    applying the scaling factor to at least one of the first signal strength or the second signal strength; and
    reselecting to the neighboring base station responsive to determining that the first signal strength is greater than the second signal strength for a period of time.

2. The method of claim 1, wherein the mobile computing device determines the mobility state irrespective of a number of reselections performed by the mobile computing device.

3. The method of claim 1, wherein:
    determining the scaling factor comprises determining a first scaling factor for the first signal strength and determining a second scaling factor for the second signal strength; and
    applying the scaling factor to at least one of the first signal strength or the second signal strength comprises applying the first scaling factor to the first signal strength and applying the second scaling factor to the second signal strength.

4. The method of claim 1, wherein the mobility state is indicative of the rate of movement of the mobile computing device and wherein the mobility state is associated with a number of reselections.

5. The method of claim 1, wherein the mobility state comprises one of:
    a high mobility state;
    a medium mobility state; or
    a normal mobility state.

6. A mobile computing device comprising:
    a sensor device to obtain sensor data;
    a processor, coupled to the sensor device, the processor to:
        receive the sensor data from the sensor device;
        determine a rate of movement of the mobile computing device based, at least in part, on the sensor data;
        determine a mobility state of the mobile computing device based on the rate of movement;
        determine a first signal strength of a neighboring base station relative to a second signal strength of a current base station;
        determine a scaling factor based on the mobility state;
        apply the scaling factor to at least one of the first signal strength or the second signal strength; and
        reselect to the neighboring base station responsive to a determination that the first signal strength is greater than the second signal strength for a period of time.

7. The mobile computing device of claim 6, wherein the processor is further to:
    transition to the mobility state or remain in the mobility state, irrespective of a number of reselections performed by the mobile computing device.

8. The mobile computing device of claim 6, wherein:
    determining the scaling factor comprises determining a first scaling factor for the first signal strength and determining a second scaling factor for the second signal strength; and
    applying the scaling factor to at least one of the first signal strength or the second signal strength comprises applying the first scaling factor to the first signal strength and applying the second scaling factor to the second signal strength.

9. The mobile computing device of claim 6, wherein the processor is to determine the rate of movement of the mobile computing device by:
    computing movement data based, at least in part, on the sensor data; and
    determining the rate of movement of the mobile computing device based, at least in part, on the movement data.

10. The mobile computing device of claim 6, wherein the mobility state comprises one of:
    a high mobility state;
    a medium mobility state; or
    a normal mobility state.

11. The mobile computing device of claim 6, wherein the sensor device comprises one or more of a global positioning system device, a gyroscope, an accelerometer, a compass, a camera, or a barometer.

12. The mobile computing device of claim 6, wherein the processor is to determine the rate of movement of the mobile computing device by:
    determining a physical location of the mobile computing device based on the sensor data; and
    determining the rate of movement based on the physical location of the mobile computing device.

13. A non-transitory computer-readable storage medium storing instructions which, when executed, cause a processor to perform operations comprising:
    determining a rate of movement of a mobile computing device based, at least in part, on sensor data received from a sensor device;
    determining a mobility state of the mobile computing device based on the rate of movement;

determining a first signal strength of a neighboring base station relative to a second signal strength of a current base station;

determining, by the processor, a scaling factor based on the mobility state;

applying the scaling factor to at least one of the first signal strength or the second signal strength; and reselecting, by the processor, to the neighboring base station responsive to determining that the first signal strength is greater than the second signal strength for a period of time.

14. The non-transitory computer-readable storage medium of claim 13, wherein the operations further comprise:

transitioning to the mobility state irrespective of a number of reselections performed by the mobile computing device.

15. The non-transitory computer-readable storage medium of claim 13, wherein the operations further comprise:

remaining in the mobility state irrespective of a number of reselections performed by the mobile computing device.

16. The non-transitory computer-readable storage medium of claim 13, wherein:

determining the scaling factor comprises determining a first scaling factor for the first signal strength and determining a second scaling factor for the second signal strength; and applying the scaling factor to at least one of the first signal strength or the second signal strength comprises applying the first scaling factor to the first signal strength and applying the second scaling factor to the second signal strength.

17. The non-transitory computer-readable storage medium of claim 13, wherein determining the rate of movement of the mobile computing device comprises:

computing movement data based, at least in part, on the sensor data; and determining the rate of movement of the mobile computing device based, at least in part, on the movement data.

18. The non-transitory computer-readable storage medium of claim 13, wherein the mobility state comprises one of:

a high mobility state;

a medium mobility state; or a normal mobility state.

19. The non-transitory computer-readable storage medium of claim 13, wherein the sensor device comprises one or more of a global positioning system device, a gyroscope, an accelerometer, a compass, a camera, or a barometer.

20. The non-transitory computer-readable storage medium of claim 13, wherein determining the rate of movement comprises:

determining a physical location of the mobile computing device based on the sensor data; and determining the rate of movement based on the physical location of the mobile computing device.

* * * * *